Sept. 1, 1959 J. W. KEIL 2,902,389

PROCESS OF BONDING POLYSILOXANES TO A SURFACE AND THE RESULTING PRODUCT

Filed Feb. 25, 1955

INVENTOR.
JOSEPH W. KEIL
BY Robert F. Fleming Jr.

ATTORNEY 2,902,389

PROCESS OF BONDING POLYSILOXANES TO A SURFACE AND THE RESULTING PRODUCT

Joseph W. Keil, Midland, Mich., assignor to Dow Corning Corporation, Midland, Mich., a corporation of Michigan Application February 25, 1955, Serial No. 490,537

8 Claims. (Cl. 117—72)

This invention relates to a novel means of bonding silicone elastomers and silicone adhesives to any of a wide variety of backing materials.

It is the primary object of this invention to provide a simple, inexpensive method for bonding peroxide-cured silicone elastomers and/or peroxide-cured silicone adhesives to backing materials such as metals, resins, and other solid surfaces. Other objects and advantages obtained through this invention are detailed in or will be apparent from the following specification and appended claims.

In accordance with this invention a peroxide-vulcanized silicone elastomer or peroxide-vulcanized silicone adhesive can be bonded to a solid surface by first coating said surface with an air-dried film of an organosilicon compound of the formula

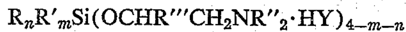

$$R_nR'_mSi(OCHR'''CH_2NR''_2\cdot HY)_{4-m-n}$$

and partial hydrolyzates thereof, wherein R is alkenyl, $n$ has an average value of from 1 to 3 inclusive, R' is any monovalent hydrocarbon radical or a hydrogen atom, $m$ has an average value of from 0 to 2 inclusive, the sum of $m$ and $n$ being from 1 to 3 inclusive, R''' is a hydrogen atom or a methyl radical, R'' is any monovalent hydrocarbon radical containing less than 11 carbon atoms per molecule, a hydrogen atom or a hydroxy alkyl radical of 2 to 3 carbon atoms per molecule, and Y is a chlorine atom or an acyloxy radical containing less than 4 carbon atoms per molecule and thereafter applying a compounded silicone elastomer or silicone adhesive containing an organic peroxide curing agent and curing and/or vulcanizing said elastomer or adhesive.

Figure 1:
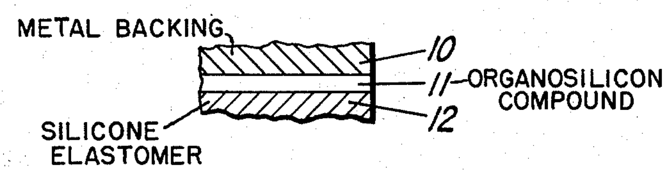
Figure 2:
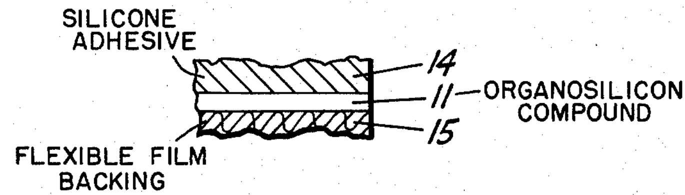

The accompanying drawings illustrate in section specific embodiments of this invention. Figure 1 is a sectional view of a portion of an assembly comprising silicone elastomer bonded to a metal backing. The metal backing 10 and the silicone elastomer 12 are bonded together by the organosilicon compound 11. Figure 2 differs from Figure 1 in that the backing material 15 is a flexible film and the layer 14 bonded thereto with the organosilicon compound 11 is a silicone adhesive.

The backing material to which the silicone elastomer or silicone adhesive can be bonded by the method of this invention can be any flexible or non-flexible solid material. Specific examples of the solid materials which are operable in this invention include metals such as aluminum, steel, lead, copper, platinum, gold or tin; glass and other ceramic materials and glass cloth or glass cloth coated with organosilicon resins; asbestos and organic materials such as cellulose esters, for example cellulose acetate, cellulose butyrate, cellulose nitrate, and cellulose propionate; cellulose ethers, for example ethylcellulose, butylcellulose, and benzylcellulose; vinyl polymers such as polyvinylchloride, polyvinyl alcohol and copolymers of vinyl chloride and vinyl acetate, and vinyl chloride and vinylidene chloride; polystyrene; polyamides; polyesters such as ethylene-glycol-terephthalates; polyethylene; fluorocarbon polymers, for example polytetrafluoroethylene and polychlorotrifluoroethylene; organic elastomers, for example natural rubber, G.R.S., Buna-S, chloroprene, neoprene, butadiene-styrene copolymers, acrylonitrile-butadiene copolymers and mixtures thereof; siloxane elastomers; sulfur containing elastomers such as ethylene polysulfides; acrylic polymers such as methylmethacrylate; acrylonitrile and methylmethacrylate polymers and copolymers thereof; organic fabrics such as cotton, silk, wool, rayon, and any of the various synthetic organic fabrics; and wood and wood products.

The organosilicon compounds which are operative as priming or bonding agents in this invention can be monomeric silanes or partial condensates thereof, i.e. polymeric materials in which some or all of the silicon atoms are linked through oxygen atoms. In the silanes and/or partial condensates, at least one and as many as three alkenyl radicals such as vinyl, allyl, or octadecenyl are attached directly through C—Si bonding to each silicon atom.

Additionally, up to 2 monovalent hydrocarbon radicals other than alkenyl radicals can be attached directly to each silicon atom. These are represented by R' in the formula supra. The radicals represented by R' can be, for example, alkyl radicals such as methyl, ethyl, butyl, isopropyl and octadecyl; aryl radicals such as phenyl, tolyl and xenyl; aralkyl radicals such as benzyl; and cycloaliphatic radicals such as cyclopentyl, cyclohexyl and cyclohexenyl. Some of the radicals represented by R' can also be hydrogen atoms. At least one alkenyl group (i.e. R) must be attached to each silicon and not more than a total of 3 alkenyl and other monovalent hydrocarbons can be attached to each silicon atom (i.e. $n+m=1$ to 3).

In the formula of the organosilicon compounds operative herein, R'' represents any monovalent hydrocarbon radical of less than 11 carbon atoms, hydrogen, or hydroxy-ethyl or hydroxy-propyl radicals. Thus R'' can represent alkyl radicals, aryl radicals, alkenyl radicals, aralkyl radicals, and/or cycloaliphatic radicals, said radicals containing less than 11 carbon atoms; or a hydrogen atom; or any hydroxy-ethyl or any hydroxy-propyl radical. R'' can represent a single radical or different radicals in the same composition. R''' represents a hydrogen atom and/or a methyl radical.

The Y groups in the compounds of this invention can be a chlorine atom or an acetoxy, propionyl or formoyl radical.

The compositions of this invention are best prepared by reacting silanes of the formula $R_nR'_mSiY_{4-m-n}$ wherein R, R', $m$, $n$ and Y are as defined supra, with amines of the formula $R''_2NCH_2CHR'''OH$ where R'' and R''' are as defined supra. If desired, this reaction can be carried out in the presence of hydrocarbon solvents such as benzene, toluene, petroleum ether, chlorinated hydrocarbon solvents such as methylene chloride and the like or in the presence of tertiary alcohols such as t-butanol. Preferably the solvent should be a low boiling material which is easily removed after the reaction is complete. The preparation of these compositions is more fully described and detailed in U.S. patent application Serial No. 465,436, filed October 28, 1954, now abandoned.

Any organosiloxane elastomer which can be cured or vulcanized with an organic peroxide is operative herein. Such elastomers are well known and widely documented in the art and are bonded to any of the backings merely by applying the above-identified organosilicon compounds to said backing and permitting the organosilicon compound to dry. Drying can be accomplished in an oven heated to about 100° C. or it can be merely air-dried at room temperature. Thereafter the organosiloxane elastomer in an uncured or partially cured state, i.e. the compounded elastomer containing an organic peroxide can be applied to the treated surface by any convenient means such as dipping, doctoring, brushing, spraying, or merely applying a sheet of such material on the said surface. Thereafter the organosiloxane elastomer is cured or vulcanized by heat or by heat and pressure as required by the particular organosiloxane elastomer being employed.

The term silicone adhesive as employed herein refers to rubbery and/or non-rubbery organosiloxanes which when cured or partially cured with organic peroxides, retain an adhesive character. Illustrative of the adhesives included herein are partially vulcanized organosiloxanes such as are disclosed in U.S. Patent 2,460,795; and organopolysiloxane compositions comprising 5–70 percent by weight of a benzene soluble resin copolymer of $SiO_2$ units and $R_3SiO_{1/2}$ units wherein R is an alkyl radical of less than 4 carbon atoms or a phenyl radical, and where the ratio of $R_3SiO_{1/2}$ units to $SiO_2$ units is from .6:1 to .9:1 inclusive, and 95–30 percent by weight of a diorganosiloxane having the general formula $R'_2SiO$, where R' is methyl or phenyl having the viscosity of at least 1,000,000 cs. at 25° C. and at least 90 percent of the total number of R and R' radicals are alkyl radicals.

It is apparent to one skilled in the art that this invention is not limited in scope to any particular siloxane adhesive and all silicone adhesives cured with an organic peroxide are contemplated herein. Any organosiloxane adhesive as defined herein can be firmly adhered to any of the operative backings listed above by the method detailed above for organosiloxane elastomers.

The method of this invention can be employed to produce a wide range of products including silicone rubber coated metals for such uses as duct work in airplanes and silicone adhesive pressure sensitive tapes. The widespread use of silicone elastomers and silicone adhesives as coatings on backing materials and the need for adequate bonding between such silicones and the backing materials assures this invention of commercial significance and success.

The examples which follow are intended to aid those skilled in the art to better understand this invention and should not be construed as limiting the scope of this invention which is properly delineated in the appended claims. All parts and percentages in the examples are based on weight unless otherwise specified.

*Example 1*

An aluminum panel was cleaned by wiping with toluene. Thereafter, a 1 percent solution of $$CH_2{=}CH{-}CH_2{-}Si[OCH_2CH_2N(CH_3)_2 \cdot HOOCCH_3]_3$$

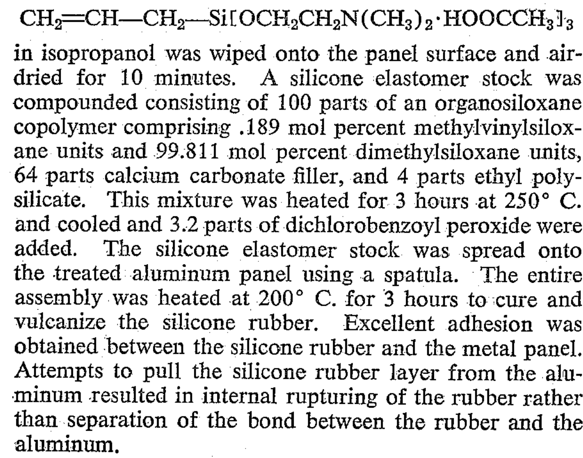

in isopropanol was wiped onto the panel surface and air-dried for 10 minutes. A silicone elastomer stock was compounded consisting of 100 parts of an organosiloxane copolymer comprising .189 mol percent methylvinylsiloxane units and 99.811 mol percent dimethylsiloxane units, 64 parts calcium carbonate filler, and 4 parts ethyl polysilicate. This mixture was heated for 3 hours at 250° C. and cooled and 3.2 parts of dichlorobenzoyl peroxide were added. The silicone elastomer stock was spread onto the treated aluminum panel using a spatula. The entire assembly was heated at 200° C. for 3 hours to cure and vulcanize the silicone rubber. Excellent adhesion was obtained between the silicone rubber and the metal panel. Attempts to pull the silicone rubber layer from the aluminum resulted in internal rupturing of the rubber rather than separation of the bond between the rubber and the aluminum.

*Example 2*

Aluminum panels were cleaned and etched in hot chromic acid solution. Thereafter, a 1 percent solution of $CH_2{=}CH{-}Si[OCH_2CH_2N(CH_3)_2 \cdot HCl]_3$ in isopropanol was wiped onto the surface of one aluminum panel and allowed to airdry for 10 minutes. Another aluminum panel was employed as an untreated control. A tape consisting of glass cloth coated with a dimethylsiloxane polymer consisting of 100 parts of a high viscosity dimethylsiloxane having a plasticity of 50, 40 parts of fume silica filler, 20 parts of a diatomaceous earth available commercially as Celite Super Floss, 3 parts of iron oxide as, Mapico Red, and 2.1 parts benzoyl peroxide was partially cured by winding it around a steel drum and heating to 120–130° C. for 3 minutes. This tape was pressed against each of the 2 aluminum panels and subjected to a temperature of 300° F. for 10 minutes. The tape was then pulled away from each of the panels measuring the force required to peel the tape from said panels. The untreated control panel could be peeled free of the tape by exerting 1 pound of force per inch of peel. The silicone rubber bonded to the primed aluminum panels required 4 pounds per inch to peel. The silicone rubber pulled free of the untreated aluminum panel when the bond between metal and rubber failed. The failure in the treated panel occurred within the silicone rubber itself. The cohesion of the silicone rubber was exceeded by the adhesion between the silicone rubber and metal.

*Example 3*

Employing the method of Example 2 using $$CH_2{=}CHSi[OCH_2CH_2N(C_2H_5)_2 \cdot HCl]_3$$

as the bonding or priming agent, similar results were obtained. The silicone adhesive could be pulled free of the untreated metal panel but the adhesion between the primed metal panel and the silicone rubber exceeded the cohesive strength of the rubber, hence the silicone rubber was itself internally torn before the metal-silicone bond gave way.

*Example 4*

A flexible type of an oriented film of a copolymer of ethylene glycol and terephthalic acid (available commercially as Mylar), was dipped in a 1 percent solution of $CH_2{=}CHSi[OCH_2CH_2N(CH_3)_2 \cdot HOOCH_3]_3$ in isopropanol. The primed tape was air-dried for 10 minutes and a silicone adhesive was applied to the coated surface with a spatula. The silicone adhesive employed was a copolymer of 50 parts of an organosiloxane polymer composed of $(CH_3)_3SiO_{1/2}$ units and $SiO_2$ units, having about 1.2 methyl units per silicon atom in the copolymer and 50 parts of a dimethylsiloxane having a viscosity exceeding 1,000,000 cs. at 25° C. The adhesive contained 1.5 parts of benzoyl peroxide as a curing agent. The copolymeric siloxane adhesive was applied as 40 percent solids in xylene solution. The entire tape was heated and dried for 40 minutes at 70° C. and thereafter was cured at 150° C. for 5 minutes. The adhesive was firmly bonded to the backing. The adhesive faces of two pieces of this tape were pressed firmly together and then the tapes were pulled apart. The adhesive remained firmly bonded to the backing after being so pulled when the primer was used, but on an untreated control tape, the adhesive pulled away from the backing. Thus, the adhesion between the adhesive and the backing in the tape treated according to this invention exceeds the cohesion of the adhesive itself.

A tape treated according to the method of this example and rolled up as are commercial pressure sensitive tapes, has been stored at 70° C. for 1 month and can be readily unrolled with the adhesive face remaining firmly bonded to the backing.

*Example 5*

When $$(CH_2{=}CH)\overset{CH_3}{\overset{|}{Si}}\left[O{-}\underset{H}{\underset{|}{\overset{CH_3}{\overset{|}{C}}}}{-}CH_2{-}\underset{CH_2CH_2OH}{\underset{|}{\overset{H}{\overset{|}{N}}}}\cdot H\overset{O}{\overset{\|}{C}}OCH_2CH_3\right]_2$$

is substituted for the organosilicon compound and glass cloth is substituted for the aluminum backing of Example 1, equivalent results are obtained.

*Example 6*

When a 1 percent solution of $(CH_2{=}CHCH_2)_2C_6H_5Si[OCH_2CH_2NH_2 \cdot HCOOCH_2CH_2CH_3]$ in water is substituted for the solution of an organosilicon compound in isopropanol of Example 4, equivalent pressure sensitive tapes are obtained.

*Example 7*

When

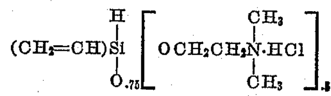

is substituted for the organosilicon compound of Example 1, equivalent results are obtained.

That which is claimed is:

1. A process for bonding a material of the group consisting of peroxide-vulcanized organopolysiloxane elastomers and peroxide-cured organopolysiloxane adhesives to a solid surface which comprises coating the solid surface with a liquid comprising an organosilicon compound of the group consisting of compounds of the formula $R_nR'_mSi(OCHR'''CH_2NR''_2 \cdot HY)_{4-m-n}$ and partial hydrolyzates thereof wherein R represents alkenyl radicals, R' represents radicals selected from the group consisting of any monovalent hydrocarbon radical other than alkenyl radicals and hydrogen atoms, $n$ has an average value of from 1–3 inclusive, $m$ has an average value of from 0 to 2 inclusive, the sum of $m+n$ being from 1–3 inclusive, R''' is selected from the group consisting of a hydrogen atom and a methyl radical, R'' is selected from the group consisting of monovalent hydrocarbon radicals containing less than 11 carbon atoms per molecule, hydrogen atoms, and hydroxy alkyl radicals of 2–3 carbon atoms per molecule, and Y is selected from the group consisting of chlorine atoms and any acyloxy radical containing less than 4 carbon atoms per molecule, drying said organosilicon compound and thereafter applying to the treated surface a curable compounded organic-peroxide-containing organopolysiloxane composition selected from the group consisting of non-adhesive elastomers, rubbery adhesives and non-rubbery adhesives, and curing said composition.

2. The process of claim 1 wherein the organosilicon compound is $CH_2{=}CH{-}CH_2{-}Si[OCH_2CH_2N(CH_3)_2 \cdot HOOCCH_3]_3$ 3. The process of claim 1 wherein the organosilicon compound is $CH_2{=}CHSi[OCH_2CH_2N(CH_3)_2 \cdot HCl]_3$.

4. The process of claim 1 wherein the organosilicon compound is $CH_2{=}CHSi[OCH_2CH_2N(C_2H_5)_2 \cdot HCl]_3$.

5. A process for bonding a peroxide-vulcanized organopolysiloxane elastomer to a solid surface which comprises coating the solid surface with

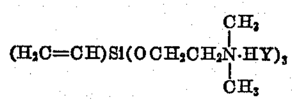

wherein Y represents an acyloxy radical of less than 4 carbon atoms per molecule and thereafter applying a curable compounded organopolysiloxane elastomer containing an organic peroxide to the treated surface and curing said elastomer in situ.

6. A process for preparing pressure sensitive tape comprising coating a flexible backing with

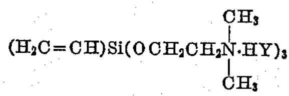

wherein Y represents an acyloxy radical of less than 4 carbon atoms per molecule and thereafter applying a curable compounded organopolysiloxane adhesive containing an organic peroxide to the treated surface and partially curing said adhesive in situ.

7. As an article of manufacture, a bonded assembly comprising a peroxide-vulcanized organopolysiloxane elastomer bonded to a base member by a coating on the base member consisting of a dried film of an organosilicon compound of the group consisting of compounds of the formula $R_nR'_mSi(OCHR'''CH_2NR''_2 \cdot HY)_{4-m-n}$ and partial hydrolyzates thereof wherein R represents alkenyl radicals, R' represents radicals selected from the group consisting of any monovalent hydrocarbon radical other than alkenyl radicals and hydrogen atoms, $n$ has an average value of from 1–3 inclusive, $m$ has an average value of from 0 to 2 inclusive, the sum of $m+n$ being from 1–3 inclusive, R''' is selected from the group consisting of a hydrogen atom and a methyl radical, R'' is selected from the group consisting of monovalent hydrocarbon radicals containing less than 11 carbon atoms per molecule, hydrogen atoms, and hydroxy alkyl radicals of 2–3 carbon atoms per molecule, and Y is selected from the group consisting of chlorine atoms and any acyloxy radical containing less than 4 carbon atoms per molecule.

8. As an article of manufacture, an assembly comprising a peroxide-vulcanized organopolysiloxane adhesive bonded to a base member by a coating on the base member consisting of a dried film of an organosilicon compound of the group consisting of compounds of the formula $R_nR'_mSi(OCHR'''CH_2NR''_2 \cdot HY)_{4-m-n}$ and partial hydrolyzates thereof wherein R represents alkenyl radicals, R' represents radicals selected from the group consisting of any monovalent hydrocarbon radical other than alkenyl radicals and hydrogen atoms, $n$ has an average value of from 1–3 inclusive, $m$ has an average value of from 0 to 2 inclusive, the sum of $m+n$ being from 1–3 inclusive, R''' is selected from the group consisting of a hydrogen atom and a methyl radical, R'' is selected from the group consisting of monovalent hydrocarbon radicals containing less than 11 carbon atoms per molecule, hydrogen atoms, and hydroxy alkyl radicals of 2–3 carbon atoms per molecule, and Y is selected from the group consisting of chlorine atoms and any acyloxy radical containing less than 4 carbon atoms per molecule.

References Cited in the file of this patent

UNITED STATES PATENTS

| | | |
|---|---|---|
| 2,436,304 | Johannson | Feb. 17, 1948 |
| 2,601,337 | Smith-Johannsen | June 24, 1952 |
| 2,610,167 | Te Grotenhuis | Sept. 9, 1952 |
| 2,637,623 | Janes | May 5, 1953 |
| 2,705,691 | Panagrossi | Apr. 5, 1955 |